United States Patent [19]

Costello et al.

[11] 4,055,163
[45] Oct. 25, 1977

[54] SOLAR HEATING SYSTEM

[76] Inventors: Frederick A. Costello; James L. Manniso; Anthony J. DiPinto; Gerald W. Smith, all of 1605 Ayre St., Newport, Del. 19804

[21] Appl. No.: 568,436

[22] Filed: Apr. 16, 1975

[51] Int. Cl.$^2$ ............................................. F24J 3/02
[52] U.S. Cl. ................................... 126/271; 237/1 A
[58] Field of Search ............... 237/1 A; 126/271, 270

[56] References Cited

U.S. PATENT DOCUMENTS

| 1,217,165 | 2/1917 | Fessenden | 126/271 X |
| 1,889,238 | 11/1932 | Clark | 126/271 |
| 3,310,102 | 3/1967 | Trombe | 126/270 X |
| 3,908,632 | 9/1975 | Poulsen | 126/271 |
| 3,918,430 | 11/1975 | Stout et al. | 126/271 |
| 3,939,819 | 2/1976 | Minardi | 126/271 |

Primary Examiner—William E. Wayner
Assistant Examiner—William E. Tapolcai, Jr.
Attorney, Agent, or Firm—Richard M. Beck

[57] ABSTRACT

Heating system comprises solar heating panel, black fluid, and structure for selectively circulating black fluid through heating panel. Panel includes enclosure having light-transmitting upper surface, and light-transmitting conduit is closely arranged in serpentine fashion within enclosure. Reflective surface is positioned under conduit arrangement. In use, black fluid circulating through conduit arrangement absorbs solar energy, and in non-use black fluid is drained from conduit arrangement whereby reflective surface functions to reflect rays of sun away from heating panel.

3 Claims, 5 Drawing Figures

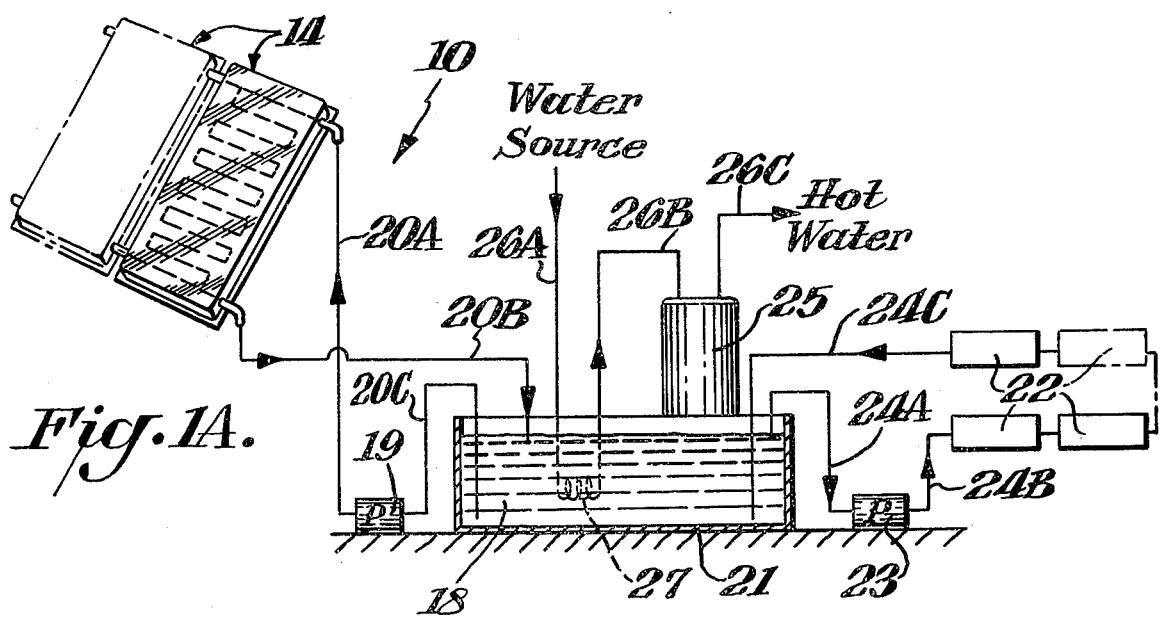
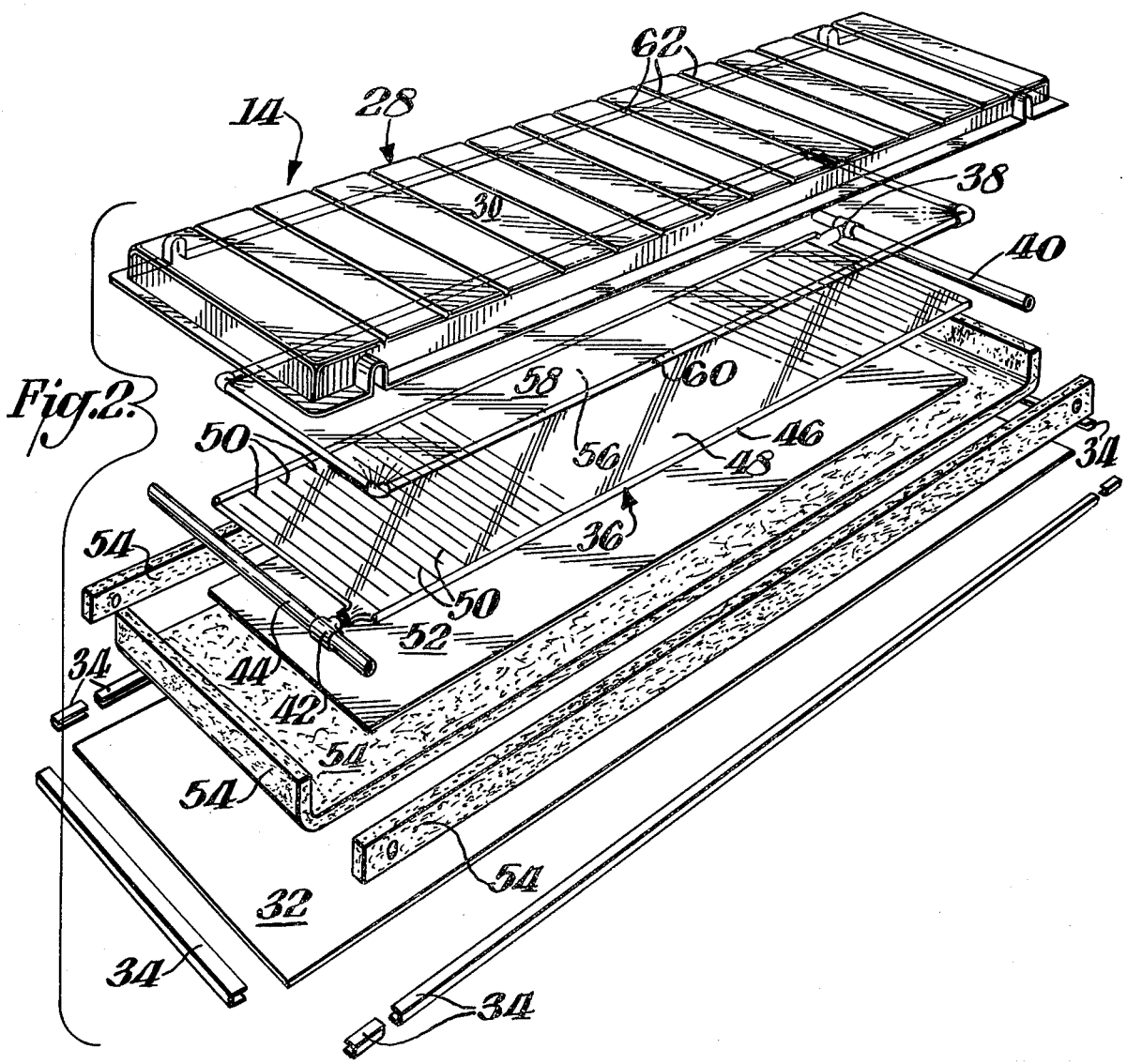

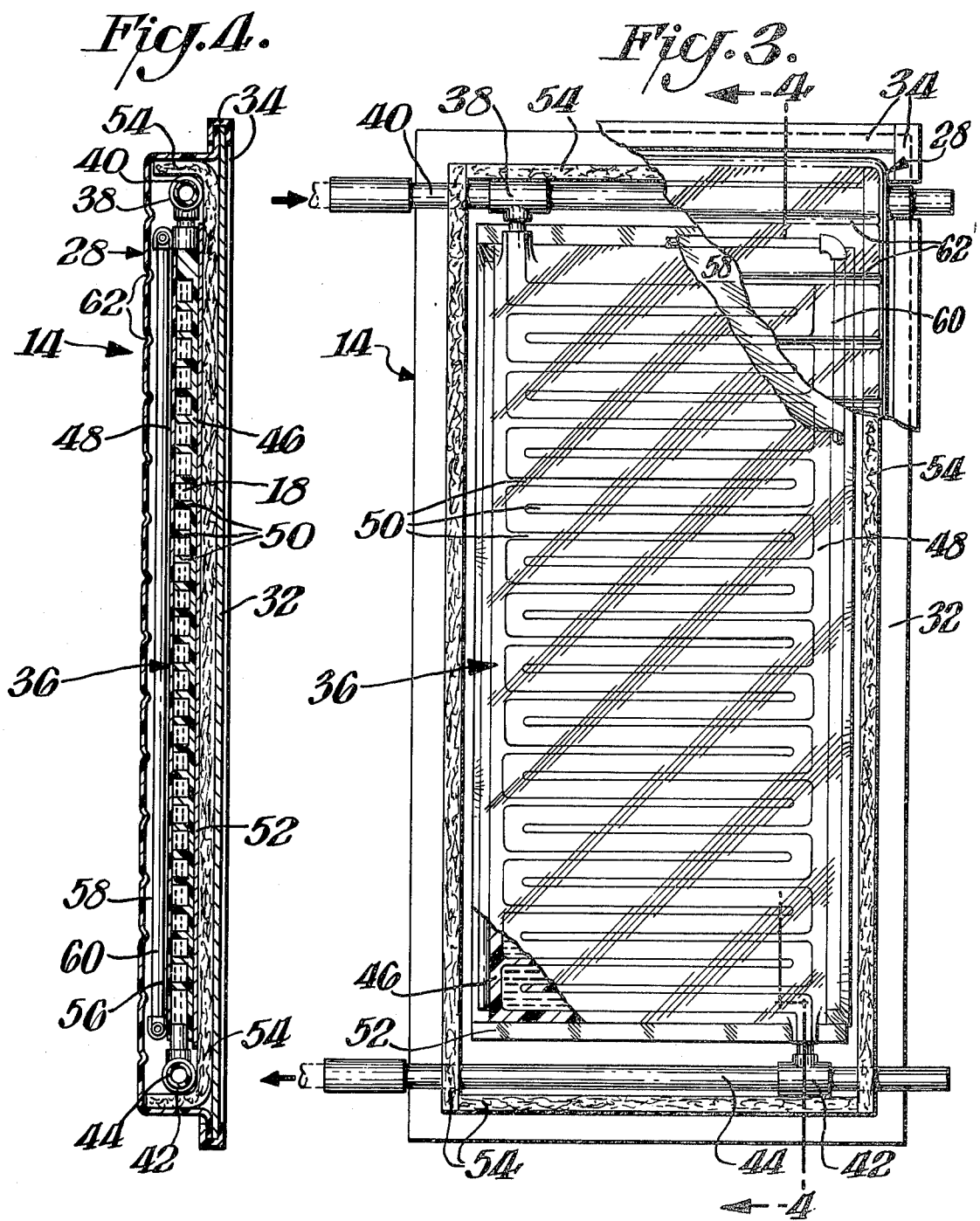

SOLAR HEATING SYSTEM

BACKGROUND OF THE INVENTION

The present invention relates to a heating system, and more particularly to a solar heating system for converting solar energy into the thermal energy of a fluid for heating purposes.

As is well known, solar heating systems generally comprise a heat collector which absorbs energy from the sun and delivers it by way of a heat transfer fluid to a storage unit. In most instances, the heat collector comprises a black plate which absorbs solar radiation, and the plate is usually located within a light-transmitting enclosure. Solar radiation is transmitted through the enclosure to the black plate collector, and the circulating heat transfer fluid absorbs thermal energy from the collector and transfers it to the storage unit for subsequent heating purposes.

One common disadvantage of the heretofore proposed solar heating systems involves the expense of construction materials as well as the expensive techniques used to fabricate the materials into the finished system. Costly materials, such as copper and other conductive metals, are often required. Also, such materials are desirable from the standpoint of resisting damage from the excessive temperature levels generated by solar systems during times of high solar radiation and low heat demand. Less expensive materials, such as thermoplastics and the like, may be readily deformed when subjected to high temperatures of the order generated by solar heating systems during times of high solar radiation and low heat demand, and this factor has discouraged persons from utilizing these materials. In some instances, solar heating systems may be shielded from the sun by intricate shutter arrangements but these constructions are expensive to manufacture and complex in operation. Also, shutters or other types of shielding devices may adversely affect the overall efficiency of the system during its operating mode.

SUMMARY OF THE INVENTION

The primary object of the present invention is to provide a solar heating system for homes and other structures which is significantly more practical than systems heretofore proposed or used.

Another object of the present invention is to provide a relatively inexpensive and highly efficient solar heating system for converting solar energy into the thermal energy of a fluid.

Still another object of the present invention is to provide a system having a solar heating panel fabricated inexpensively from relatively inexpensive materials which operates in a highly efficient and beneficial manner to convert solar energy into the energy of a fluid flowing through the panel.

In accordance with the present invention, a heating system comprises a solar heating panel, black fluid, and structure for selectively circulating the black fluid through the heating panel. The panel includes an enclosure having a light-transmitting upper surface, and a light-transmitting conduit is located within the enclosure. The conduit is closely arranged in serpentine fashion and provides a path through which the black fluid selectively circulates in response to heating demands. A reflective surface is positioned directly under the conduit arrangement. During the operating mode of the heating system, black fluid circulating through the light-transmitting conduit absorbs solar energy and transfers it away from the heating panel. In non-use, the black fluid is drained out of the conduit arrangement to thereby expose the reflective surface which then functions to reflect the rays of the sun away from the heating panel.

The black fluid may comprise water and carbon particles or other suitable additives, and the structure for selectively circulating the fluid through the heating panel may include a pump. Also, piping interconnects the pump and the upstream end of the conduit arrangement of the heating panel. An insulated storage tank for the black fluid is provided, and piping extends between the downstream end of the conduit arrangement of the heating panel and the storage tank. Space heaters are connected in series and a second pump operates to circulate fluid from the tank through the heaters for releasing thermal energy from the black fluid when heat is desired.

Preferably, the solar heating panel includes at least one layer of light-transmitting material air spaced between the upper surface of the enclosure and the conduit arrangement. Specifically, a pair of spaced apart light-transmitting layers is air spaced between the upper surface of the enclosure and the conduit arrangement, and these layers may comprise flexible film surrounding an endless frame and supported thereby.

Another feature of the present invention involves sealing the enclosure and partially filling the interior thereof with a gas having a thermal conductivity lower than that of air, such as fluorinated hydrocarbon gases, for example. These gases act as insulators to reduce heat loss from the enclosure. Also, the light-transmitting upper surface of the enclosure may include downwardly depressed ribs therein for strengthening purposes and also to reduce circulation of the gases within the enclosure.

Insulating material increases the efficiency of the heating system, and such material may be used to surround the conduit arrangement at the sides and bottom thereof. Moreover, the system may comprise a plurality of solar heating panels connected together in parallel in side-by-side fashion.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 1A is a flow schematic view illustrating the system of FIG. 1 in more detail;

FIG. 2 is an exploded assembly view of a solar heating panel of the system shown in FIG. 1;

FIG. 3 is a top plan view of the solar heating panel with portions broken away to show interior details; and FIG. 4 is a sectional view taken along line 4—4 of FIG. 3.

DETAILED DESCRIPTION OF THE INVENTION

Figure 1:
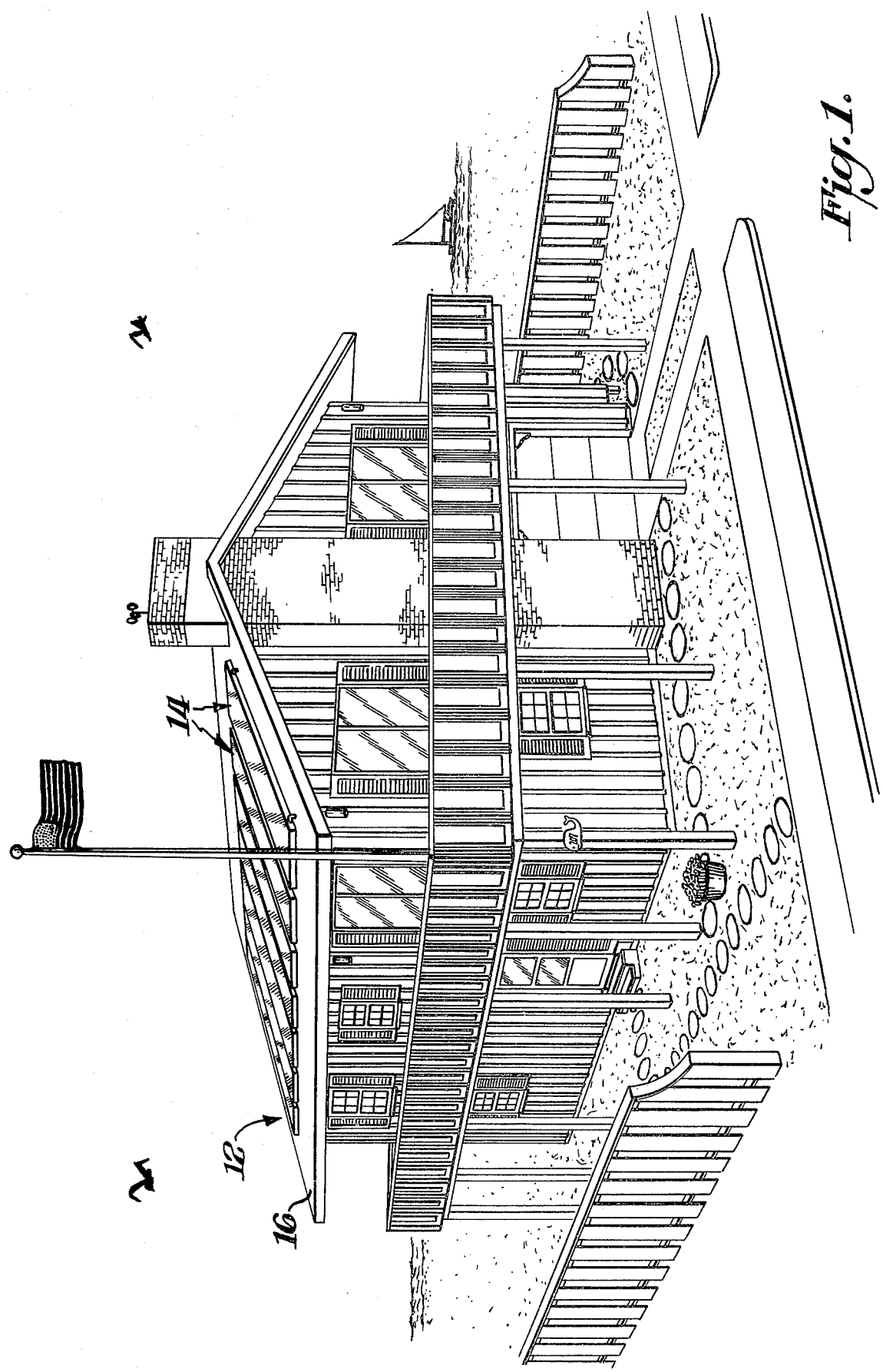
FIG. 1 is a perspective view diagrammatically illustrating a solar heating system, according to the present invention.

Referring in more particularity to the drawing, FIG. 1 illustrates a solar heating system 10 for heating the interior of a dwelling 12. The system 10 comprises one or more solar heating panels 14 connected together in parallel in side-by-side fashion and secured to the roof 16 of the dwelling. The heating panels face in a southward direction, and for the average home, twelve to thirteen panels may be used to supply heat to the dwelling.

The system 10 also includes black fluid 18 and a pump 19 for selectively circulating the black fluid through the bank of heating panels 14, as described more fully below. A first run of piping 20A interconnects the pump 19 and the panels 14, and the downstream end of the panels 14 is connected to an insulated storage tank 21 for the black fluid 18 by another run of piping 20B. A third run of piping 20C interconnects the tank 21 and the upstream side of the pump 19. Space heaters 22 are connected in series and a second pump 23 is provided to circulate black fluid from the tank 21 through the heaters and back to the tank. Suitable piping 24A, 24B and 24C interconnects the pump 23, space heaters 22 and tank 21. Also, the black fluid 18 in the storage tank 21 may be used to preheat water prior to introducing the water into a suitable heater 25. As shown in FIG. 1A, water from a source is conveyed along line 26A to a heat exchanger 27 in heat exchanging relationship with the black fluid 18 in the tank 21. The preheated water then travels along line 26B to the water heater 25. Line 26C connects the downstream end of the water heater 25 to appropriate locations throughout the dwelling 12.

The expression black fluid has been used throughout the disclosure and it is intended to include all fluids that are highly absorbent of solar radiation, as explained in more detail below.

One of the solar heating panels 14 is shown in detail in FIGS. 2–4. Specifically, the heating panel 14 includes an enclosure 28 having a light-transmitting upper surface 30 fabricated from transparent or translucent plastic material by forming techniques known in the art. The upper half of the enclosure 28 is sealed to a base plate 32 by suitable adhesive or other fastening structure, and extrusions 34 may be utilized at the periphery of the seal juncture to maintain the enclosre in assembled relationship. The base plate 32 may be formed from wood, metal or plastic material.

The solar heating panel 14 also includes a light-transmitting conduit 36 within the enclosure 28 closely arranged in serpentine or zig-zag fashion, as shown best in FIG. 3. As explained more fully below, the conduit 36 provides a path along which the black fluid 18 circulates during the operating mode of the heating system 10. The conduit arrangement 36 includes an inlet end 38 connected to a distribution pipe 40 and an outlet end 42 connected to a header 44. The header connects with the piping 20B leading to the insulated storage tank 21.

The conduit arrangement 36 may be fabricated from plastic material by conventional forming techniques. As shown best in FIG. 4, the conduit comprises a contoured lower section 46 with a flat upper section 48 heat sealed thereto or otherwise secured, such as by glue, for example. The lower section includes a series of spaced apart upstanding partitions 50 with every other partition secured to a common side wall of the lower section 46 but not completely extending to the opposite side wall. This partition pattern provides the serpentine path of the conduit when the upper section 48 is secured in place.

A reflective surface 52 is located directly under the conduit arrangement 36. Since the conduit arrangement and each of the material layers directly above are light-transmitting, when the conduit is drained of black fluid 18, the reflective surface 52 functions to reflect the rays of the sun away from the solar heating panel 14, for reasons explained below. The reflective surface 52 may comprise aluminum foil or a metallized layer applied to a suitable backing material. Alternatively, the separate and distinct reflective material 52 may be omitted and the underside of the conduit arrangement 36 supplied with a reflective metallized finish, if desired.

Insulation 54, such as fiberglass, rockwool or styrofoam, for example, is located within the enclosure 28 where it surrounds the conduit arrangement 36 at the sides and bottom thereof. As shown best in FIG. 2, the reflective surface 52 rests upon the insulation and the conduit 36 fits directly over the reflective material. Suitable openings are provided in the insulation for the distribution pipe 40 and the header 44. The insulation functions to prevent heat losses in order to maximize the solar radiation absorbed by the black liquid during the operating mode of the heating system.

The solar heating panel 14 also includes a pair of spaced apart light-transmitting film layers 56, 58 air spaced between the upper surface 30 of the enclosure 28 and the conduit arrangement 36. A suitable rectangular frame 60 fabricated of cardboard or similar material may be utilized to support the light-transmitting film layers. The frame 60 is dimensioned to cover the conduit arrangement 36, and the film may comprise a sleeve of polyethylene, for example, which is simply heat shrunk to surround the frame. The film layers 56, 58 function to minimize radiation heat transfer from the interior of the enclosure 28 to the exterior thereof. The light-transmitting material of these film layers and the upper surface 30 of the enclosure are preferably selected and matched so that wave lengths of infra-red radiation passed by one material are absorbed by the other. The light-transmitting material may be translucent or transparent.

The interior of the enclosure 28 may be at least partially filled with a gas having a thermal conductivity lower than that of air, such as fluorinated hydrocarbon gases, for example. This procedure reduces heat losses since these gases function as insulators. Moreover, the particular gas selected may be used alone or in combination with other gases, such as air. When an insulating gas is used, it is advantageous to provide the upper surface of the enclosure 28 with downwardly depressed ribs 62 to reduce circulation of the gases within the enclosure. The ribs 62 function as baffles to minimize and interrupt gas currents within the enclosure to thereby reduce heat losses from the enclosure. Also, the ribs 62 serve to strengthen the enclosure 28. When an insulating gas is used, the enclosure must be completely sealed including the cut-outs for the distribution pipe 40 and the header 44.

In use, thermostatic controls may be incorporated into the heating system 10 to operate the pump 19 when the temperature of the fluid in the tank 21 drops below a certain level. Upon actuation of the pump 19, black fluid 18 is circulated along lines 20A and 20C from the tank 21 to the heating panels 14. As the black fluid passes through the conduit arrangement 36, it effectively masks the reflective surface 52 from the rays of the sun. The black fluid moves along the serpentine conduit path where it absorbs solar radiation. The temperature of the fluid is thereby elevated, and heated fluid from each of the panels 14 empties into the header 44 connected to piping 20B which empties into the insulated storage tank 21. When heat is desired inside the dwelling 12, the pump 23 is activated and heated black fluid in the storage tank is delivered via the pump 23 and the piping 24A and 24B to the space heaters 22 where the thermal energy of the liquid is released into the interior of the dwelling 12. The spent fluid is returned from the heaters 22 to the tank 21 along the line 24C.

During non-use of the heating system 10, the black fluid 18 is drained from the individual heating panels 14 to thereby expose the reflective surface 52. During months when excessively high temperatures exist, the reflective surface 52 operates to reflect the rays of the sun away from the heating panels 14. Hence, excessive heat generation is eliminated, and this feature enables inexpensive fabrication of the heating panels from relatively inexpensive materials, as described above. Without an effective system to prevent heat generation during times of high solar radiation and low heat demand, fabrication from such inexpensive materials would be unwise since these materials are deformed and otherwise adversely affected by high temperature.

The black fluid 18 of the present invention may comprise water and carbon particles. Alternatively, water and suitable organic and/or inorganic dyes may be used to blacken the fluid of the heating system 10. Air and a suspension of carbon particles may also be used as the black fluid 18. When liquid is employed suitable chemicals well known in the art may be added to the liquid to prevent it from freezing during dark winter days or nights. Alternatively, the heating panels may be drained of liquid during these times, if desired, to thereby eliminate the need for these costly chemicals.

While a particular heating system 10 has been described, the heating panel 14 of the present invention may be used in a variety of solar heating systems without departing from the spirit or scope of the instant invention.

What is claimed is:

1. A heating system comprising a solar heating panel, black fluid, and means for selectively circulating the black fluid through the heating panel, the panel including an enclosure having a light-transmitting upper surface, a light-transmitting conduit within the enclosure closely arranged in serpentine fashion through which the black fluid selectively circulates, and a reflective surface directly under the conduit arrangement substantially completely masked by that arrangement when black fluid is circulated therethrough and substantially completely unmasked when no black fluid is circulated therethrough, and wherein the enclosure is sealed, and the interior thereof is at least partially filled with a gas having a thermal conductivity lower than that of air.

2. A heating system as in claim 1 wherein the light-transmitting upper surface of the enclosure includes downwardly depressed ribs therein to reduce circulation of the gases within the enclosure.

3. A heating sytem as in claim 1 wherein the gas is a fluorinated hydrocarbon gas.

* * * * *